H. HATCH.
Reciprocating Churns.

No. 142,102. Patented August 26, 1873.

Attest:
W. H. Finckel
Wm. E. Chaffee

Inventor:
Hiram Hatch
by Geo. W. Rothwell
his Atty.

UNITED STATES PATENT OFFICE.

HIRAM HATCH, OF JEFFERSON, MAINE.

IMPROVEMENT IN RECIPROCATING CHURNS.

Specification forming part of Letters Patent No. 142,102, dated August 26, 1873; application filed May 16, 1873.

*To all whom it may concern:*

Be it known that I, HIRAM HATCH, of Jefferson, in the county of Lincoln and State of Maine, have invented an Improvement in Churns, of which the following is a specification:

This invention relates to that class of churns in which a horizontally-reciprocating motion is given to the dasher; and the invention consists of a cage-like dasher composed of a rectangular or other shaped frame-work, parts of which are perforated, and in which rhombic or angular rods or bars are inserted, so as to more effectually break the milk globules, a central slotted standard being provided, whereby the dasher is connected with its operating-lever, the whole being moved on guide-rails within the churn.

Figure 1:
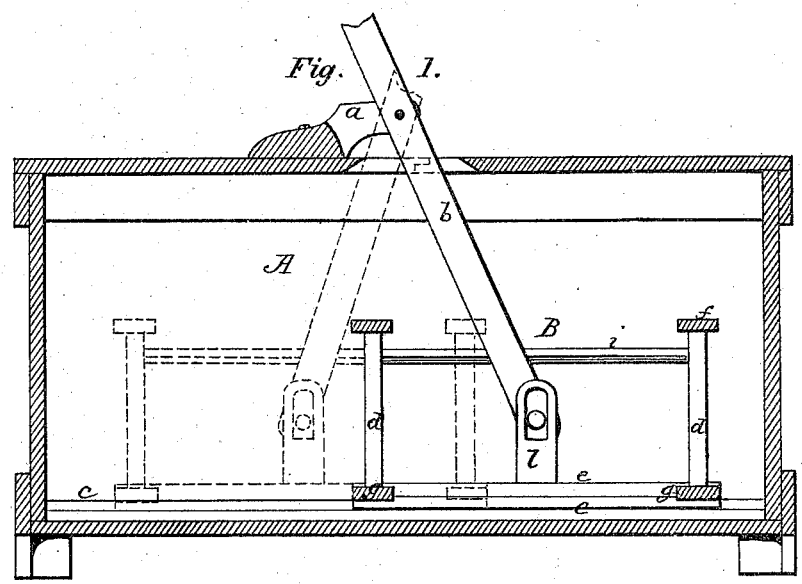
Figure 2:
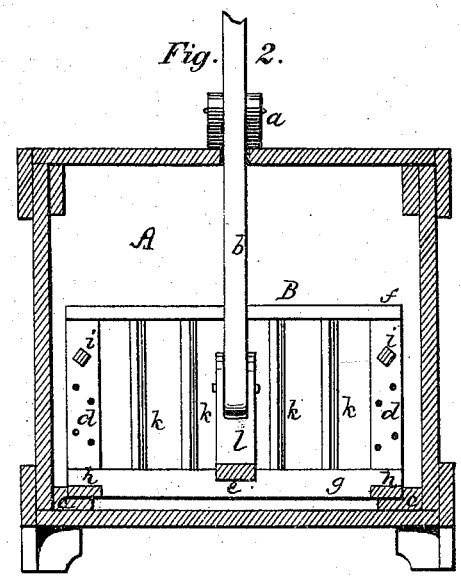

In the drawings, Figure 1 is a central vertical longitudinal section, and Fig. 2 a central vertical cross-section, of the dasher applied in a churn.

The letter A represents a churn-body of any suitable form, preferably rectangular, having a removable or partly removable lid, an outlet for water, &c., a bearing, $a$, in which the operating-lever $b$ is hung, a slot in the lid, through which said lever passes, and L-shaped guide-rails $c$ $c$ on the bottom, on which the dasher is moved. B is the dasher, composed of a rectangular cage-like frame-work, $d$ $e f g$ $h$, the bars or pieces $e g h$ forming the bed or foundation, $d$ $d$ the vertical corners, and $f$ $g$ the top and bottom cross-pieces, respectively. $i$ $i$ are rhombic or angular bars connecting the corner pieces $d$ $d$ by having their ends fitted in them, and constitute side rails. Similar bars $k$ $k$ are fitted in the cross-pieces $f g$, and upon the bar $e$ a standard or bracket, $l$, is secured, having two ears, in which slots are made to form bearings for gudgeons on the end of the operating-lever, the said lever being placed between these ears, and its gudgeons projecting out through the slots. Round or other perforations are made in the corner pieces $d$ $d$, so as to increase the resisting surface of the dasher.

All the parts of this churn may be made of wood, thus allowing of its being constructed in a cheap yet durable manner.

The operation is as follows: The cream or milk having been poured into the body A, and the lid secured by hooks or other devices, the lever is moved back and forth, whereby the dasher is impelled in a straight line along the guide-rails, the slotted standard counteracting the necessarily circular movement of the lever, as indicated in dotted lines, Fig. 1. As the dasher agitates the milk its several angular portions, especially the bars $k$ and $i$ and perforated corners $d$ $d$, so act as to quickly break the cream globules, and thus rapidly produce butter.

As will be readily understood, this multiplication of angular surfaces greatly increases the efficiency of the dasher and tends to lessen the labor of churning.

When butter is formed the buttermilk may be run off, and by putting the butter in either end with some cold water it can be "worked" by moving the dasher against it, so that there is no necessity for taking it out of the churn until it is ready for use; and also the butter need not be dressed by the hands, as is usual.

Having thus described my invention, what I claim as new, and desire to secure by Letters Patent, is—

The combination, in a churn-dasher, of a cage-like frame-work, $d$ $e f g h$, having corner pieces $d$, perforated, and rhombic angular bars or rods $i$ $k$, substantially as and for the purpose specified.

In testimony whereof I have hereunto subscribed my name before two witnesses.

HIRAM HATCH.

Witnesses:
 C. M. NUTTER,
 R. M. MANSUR.